United States Patent [19]

Singh et al.

[11] Patent Number: 5,527,631
[45] Date of Patent: Jun. 18, 1996

[54] HYDROCARBON REFORMING CATALYST MATERIAL AND CONFIGURATION OF THE SAME

[75] Inventors: Prabhakar Singh, Export; Larry A. Shockling, Plum Borough; Raymond A. George, Pittsburgh; Richard A. Basel, Plub Borough, all of Pa.

[73] Assignee: Westinghouse Electric Corporation, Pittsburgh, Pa.

[21] Appl. No.: 539,814

[22] Filed: Oct. 4, 1995

Related U.S. Application Data

[63] Continuation of Ser. No. 198,711, Feb. 18, 1994, abandoned.

[51] Int. Cl.$^6$ .............................. H01M 8/18; H01M 8/10
[52] U.S. Cl. ................ 429/20; 429/26; 429/33; 429/34; 502/527
[58] Field of Search ............................ 429/20, 26, 17, 429/33, 34; 502/439, 527

[56] References Cited

U.S. PATENT DOCUMENTS

| | | | |
|---|---|---|---|
| 2,408,164 | 9/1976 | Foster | 502/527 X |
| 4,233,187 | 11/1980 | Atwood et al. | |
| 4,328,130 | 5/1982 | Kyan | 502/527 X |
| 4,337,178 | 6/1982 | Atwood et al. | |
| 4,395,468 | 7/1983 | Isenberg | 429/31 |
| 4,407,785 | 10/1983 | Piefferle | |
| 4,490,444 | 12/1984 | Isenberg | 429/31 |
| 4,729,931 | 3/1988 | Grimble | 429/17 |
| 4,751,152 | 6/1988 | Zymboly | 429/31 |
| 4,885,078 | 12/1989 | Spengler et al. | 204/432 |
| 4,898,792 | 2/1990 | Singh et al. | 429/19 |
| 4,983,471 | 1/1991 | Reichner et al. | 429/19 |
| 5,047,299 | 9/1991 | Shockling | 429/20 |
| 5,082,751 | 1/1992 | Reichner | 429/19 |
| 5,143,800 | 9/1992 | George et al. | 429/20 |
| 5,169,730 | 12/1992 | Reichner et al. | 429/20 |
| 5,250,489 | 10/1993 | Dalla Betta et al. | 502/262 |

FOREIGN PATENT DOCUMENTS

| | | |
|---|---|---|
| 0025308 | 3/1981 | European Pat. Off. |
| 0045126 | 2/1982 | European Pat. Off. |
| 0226306 | 6/1987 | European Pat. Off. |
| 0240796 | 10/1987 | European Pat. Off. |
| 0376436 | 7/1990 | European Pat. Off. |
| 0443241A1 | 8/1991 | European Pat. Off. |
| 0468698A1 | 1/1992 | European Pat. Off. |

OTHER PUBLICATIONS

JP 62–80971 Patent Abstracts of Japan, Sep. 10, 1987, vol. 11, No. 280 (E–539) (2727).
JP 03–109202 Patent Abstracts of Japan, Jul. 29, 1991, vol. 15, No. 297 (C–854) (4285).
JP 61–267272 Patent Abstracts of Japan, Apr. 14, 1987, vol. 11, No. 119 (E–499) (2566).

*Primary Examiner*—John S. Maples

[57] ABSTRACT

A hydrocarbon reforming catalyst material comprising a catalyst support impregnated with catalyst is provided for reforming hydrocarbon fuel gases in an electrochemical generator. Elongated electrochemical cells convert the fuel to electrical power in the presence of an oxidant, after which the spent fuel is recirculated and combined with a fresh hydrocarbon feed fuel forming the reformable gas mixture which is fed to a reforming chamber containing a reforming catalyst material, where the reforming catalyst material includes discrete passageways integrally formed along the length of the catalyst support in the direction of reformable gas flow. The spent fuel and/or combusted exhaust gases discharged from the generator chamber transfer heat to the catalyst support, which in turn transfers heat to the reformable gas and to the catalyst, preferably via a number of discrete passageways disposed adjacent one another in the reforming catalyst support. The passageways can be slots extending inwardly from an outer surface of the support body, which slots are partly defined by an exterior confining wall. According to a preferred embodiment, the catalyst support is non-rigid, porous, fibrous alumina, wherein the fibers are substantially unsintered and compressible, and the reforming catalyst support is impregnated, at least in the discrete passageways with Ni and MgO, and has a number of internal slot passageways for reformable gas, the slot passageways being partly closed by a containing outer wall.

18 Claims, 2 Drawing Sheets

HYDROCARBON REFORMING CATALYST MATERIAL AND CONFIGURATION OF THE SAME

GOVERNMENT CONTRACT

The Government of the United States of America has rights in the invention pursuant to Cooperative Agreement DE-AC21-80ET-17089 awarded by the United States Department of Energy.

This application is a continuation-in-part, of application Ser. No. 08/198,711 filed Feb. 19, 1994, abandoned.

BACKGROUND OF THE INVENTION

1. Field of the Invention

The invention relates to the field of catalytic hydrocarbon gas reformers, and to an improved catalyst support material and catalyst support configuration for use in a catalytic hydrocarbon gas reformer. The invention is particularly useful in high temperature, solid oxide electrolyte electrochemical generators for electrical power generation. More particularly, one aspect of the invention is directed to a reforming catalyst support comprising a porous, non-rigid fibrous material having improved dimensional stability during prolonged operation, and another aspect of the invention is directed to a reforming catalyst support mounted in a configuration defining discrete flow paths along the length of the catalyst support, for improved heat transfer rate and resistance to pressure drop across the reformable hydrocarbon gas flow paths.

Natural gases comprising methane, ethane, propane, butane and/or nitrogen and the like, vaporized petroleum fractions such as naphtha and the like, and also alcohols, for example ethyl alcohol and the like, are appropriate fuels for electrochemical reactions, and can be consumed in an electrochemical generator apparatus for generating electrical power, for example, a high temperature, solid oxide electrochemical fuel cell generator. However, the direct use of hydrocarbon fuels for generating electrical power can cause carbon deposition or the formation of soot on the electrochemical fuel cells of the generator and other generator components, at least partly from hydrocarbon cracking. Deposition of carbon on the electrochemical generator components, for example, insulation boards, fuel distribution boards, support blocks, partition boards and fuel cells, reduces the efficiency of the electrochemical generator, inter alia, by blocking transport paths, providing electrical short-circuit paths and reducing insulation effects.

To reduce carbon deposition, it is known to reform the hydrocarbon feed fuel gas entering the fuel cell chamber of an electrochemical generator apparatus into simpler molecules, especially into carbon monoxide (CO) and hydrogen ($H_2$), through the use of a reforming catalyst. Hydrocarbon reforming is therefore used to provide low carbonizing fuels for the electrochemical cells. It is also known that the presence of water vapor ($H_2O_{(g)}$) and/or carbon dioxide ($CO_2$) and a reforming catalyst allows for the direct conversion of gaseous hydrocarbons, such as natural gas, to CO and $H_2$ by an endothermic reforming reaction, i.e., requiring a supply of heat. The reforming reaction is best performed at a temperature of about 900° C.

The reformed hydrocarbon fuel is then combined, for example, in an electrochemical generator apparatus, along with an oxidant such as air, to produce heat and electric power. Since the reforming reaction is endothermic, additional thermal energy must be supplied, e.g., by direct combustion or by heat transfer through the walls of a heat exchanger, such as in a steam-air or air-air heat exchanger. Typically, the heat required for the reforming reaction in an electrochemical generator apparatus is derived from a significant fraction of the excess heat that results from operation of the electrochemical generator.

High temperature, solid oxide electrolyte fuel cells and multi-cell generators and configurations designed for converting chemical energy into direct current electrical energy, typically in the temperature range of from 600° C. to 1200° C., are well known and taught, for example, in U.S. Pat. Nos. 4,395,468 (Isenberg) and 4,490,444 (Isenberg). A multi-cell generator generally contains a plurality of parallel elongated, electrically interconnected, tubular, electrochemical fuel cells, each fuel cell having an exterior fuel electrode, an interior air electrode, a solid oxide electrolyte sandwiched between the electrodes, and means for entry of a gaseous oxidant and a gaseous hydrocarbon feed fuel. A previously reformed hydrocarbon feed fuel, i.e., converted to $H_2$ and CO, is fed into the generator at one end and flows parallel to the exterior of a fuel electrode surface that is elongated along an axis. The fuel is oxidized by an oxidant, such as oxygen or air, which is fed into the generator at another end and parallel to the interior of the air electrode surface that is elongated along an axis. Direct current electrical energy is generated. Spent fuel is combusted with spent oxidant in a separate combustion chamber and is vented from the generator as a hot combusted exhaust gas.

In the known high temperature, solid oxide electrolyte fuel cells and multi-cell generators, the hydrocarbon feed fuel gas, such as natural gas, is generally mixed with water vapor and/or carbon dioxide, typically supplied from a recirculated spent fuel gas (unoxidized) typically containing $H_2O$ and $CO_2$, and is reformed as an initial step, i.e., converted to $H_2$ and CO, through the use of a reforming catalyst, typically nickel or platinum, supported on a catalyst support material, typically rigid and highly sintered alumina pellets. Reforming the hydrocarbon feed fuel can be performed either inside or outside the electrochemical generator. However, hydrocarbon reforming outside of the electrochemical generator is less desirable in that heat energy is lost at the reformer and at the connecting conduits, making such a system more expensive and complicated than one with an internal reformer. Moreover, the hydrocarbon reforming reaction is performed at a temperature close to that of the electrochemical fuel cell operation. Accordingly, reforming efficiency is best where the reformer is inside the electrochemical generator and the largest possible fraction of excess heat that results from the fuel cell generator operation can be usefully applied.

U.S. Pat. No. 4,729,931 (Grimble) discloses a fuel cell generator having an internal catalytic hydrocarbon reformer where hot spent fuel gas containing $H_2O$ and $CO_2$ is recirculated and drawn into fresh hydrocarbon feed fuel at an ejector nozzle, and the reformable gaseous mixture is then fed through an internal hydrocarbon reforming chamber containing a packed reforming catalyst bed or packed column of finely divided Ni and Pt, disposed alongside the length of the fuel cell chamber. After flowing through the packed bed at about 900° C., the reformable gaseous mixture yields a reformed fuel gas, namely $H_2$ and CO, which is ultimately fed across the fuel electrodes in the fuel cell chamber. The use, however, of not easily monitored or controlled amounts of recirculated spent fuel gas as a source of $H_2O$ and/or $CO_2$ combined with fresh hydrocarbon feed fuel for the reforming reaction has a potential to result in several problems due to carbon deposition on the reforming catalyst during hydrocarbon reforming and other also on generator components. Carbon deposition on the internally located reforming catalyst and catalyst support structure can result in blocked flow paths across a catalyst bed, thereby increasing the pressure drop across the bed. It can also result in increased internal stresses in catalyst support structures which are conventionally porous, rigid, sintered, alumina pellets impregnated with a reforming catalyst, thereby causing pulverization and cracking of the catalyst support structure and reducing its reforming efficiency.

Carbon deposition on a hydrocarbon reforming catalyst surface is thought to result from insufficient adsorption of $H_2O$ and/or $CO_2$ on the reforming catalyst surface, i.e., insufficient presence of the oxygen species. Reduced gasification of carbon from the adsorbed hydrocarbon feed gas, and hydrocarbon cracking, are the results. The oxygen species is needed in sufficient quantity to react with the adsorbed carbon species to form carbon monoxide. Without oxygen, carbon is formed on the reforming catalyst and on other components of the electrochemical generator. This resulting deposited carbon is encapsulating in nature and is resistant to oxidation by $H_2O$ present in the reforming atmosphere.

There have been attempts made to reduce carbon deposition on the hydrocarbon reforming catalyst and other electrochemical fuel cell generator components. In order to reduce carbon deposition on the reforming catalyst and reforming catalyst support structure, it is known to reform hydrocarbon feed fuel gas in an excess of water vapor and/or carbon dioxide in the presence of reforming catalyst.

U.S. Pat. No. 5,143,800 (George et al.) discloses a high temperature, solid oxide electrolyte fuel cell generator having an internal catalytic hydrocarbon reformer where spent fuel containing $H_2O$ and $CO_2$ is recirculated and aspirated into fresh feed hydrocarbon fuel at a circulation or mixing nozzle prior to entering the reforming chamber, and characterized in that the fresh feed inlet has a by-pass channel into the spent recirculated fuel channel having valving to control the spent fuel inclusion in the fresh hydrocarbon feed fuel prior to entering a reforming chamber containing a nickel catalyst. Additional spent fuel is combined with spent oxidant in a combustion chamber to form combusted exhaust gas that is circulated to heat the reforming chamber and other components of the fuel cell. The valve adjusted combination of spent fuel with fresh feed fuel attempts to prevent carbon deposition and soot formation within the reforming catalyst and reforming catalyst support structure and other fuel cell generator components.

Other attempts have been made to reduce carbon deposition on the hydrocarbon reforming catalyst and the reforming catalyst support structure. U.S. Pat. No. 5,169,730 (Reichner et al.) discloses a high temperature, solid oxide fuel cell having an internal catalytic hydrocarbon reformer where the recirculated spent fuel is cooled through heat transfer operations with other components of the fuel cell generator to a temperature of below 400° C. prior to entering the nozzle or ejector located at a low temperature exterior position to the main body of the generator, and then mixing with the fresh hydrocarbon feed fuel to avoid hydrocarbon cracking at the nozzle and deactivation or poisoning of the reforming catalyst.

U.S. Pat. No. 4,898,792 (Singh et al.) discloses a high temperature, solid oxide electrolyte fuel cell generator having porous, fuel conditioner boards used to distribute a hydrocarbon fuel over the fuel cells and also to act in a hydrocarbon reforming capacity. In Singh et al., the reforming catalyst material used to reduce carbon formation includes a porous, rigid pressed or sintered felt of powder or fiber alumina as It catalyst support structure impregnated or treated with a reforming catalyst including catalytic Ni and also metal salts, the salts including nitrates, formates and acetates, and metal oxides, and the metals being selected from the group of Mg, Ca-Al, Sr-Al, Ce, Ba and mixtures thereof. It is known that metal oxides are effective in readily adsorbing gaseous $H_2O$.

In all prior designs, however, during long term reforming operation on hydrocarbon fuels, there remains the possibility of performance degradation of the reforming catalyst and reforming catalyst support structure, and also of other components of a fuel cell generator. Although the operation of a reformer, for example, in an electrochemical generator, is intended to take place in a relatively carbon deposition free operating range, prolonged operation could result in carbon formation on the catalyst and catalyst support due to occasional unavoidable variation from nominal operating parameters, such as, for example, a change in O:C ratios or a change in temperature of the reformer feed gas mixture.

Commercial reforming catalyst materials presently in use for hydrocarbon reforming in high temperature, solid oxide fuel cells typically include a catalyst carrier or support structure, active catalyst deposited or impregnated on the support structure surfaces, and optionally, other promoters. The catalyst support is typically a porous material having high total surface areas (internal and external) to provide high concentrations of active sites per unit weight of catalyst. The catalyst support is also typically a rigid material which is made to withstand high pressure operating conditions, i.e., mainly a carryover from the petrochemical industry, even though high pressure designs are generally not needed when used for hydrocarbon reforming in a high temperature, solid oxide fuel cell generator applications. The commercial reforming catalyst material typically used in high temperature, solid oxide fuel cell generators consists of a porous, rigid, support catalyst made from sintered and/or pressed powdered alumina ($Al_2O_3$), that is impregnated with catalytic Ni and possibly MgO, typically in the form of pellets.

However, these commercial catalyst materials, including a porous, rigid, sintered alumina reforming catalyst support structures doped with catalyst, are prone to mechanical breakdown, thought to result in part from stresses generated in the rigid, sintered body by carbon formation on the reforming catalyst material during the reforming operation. The mechanical degradation of the reforming catalyst material, particularly the reforming catalyst support structure reduces the life of the catalyst material and, consequently, degrades the generator electrical output when used in connection with an electrochemical generator. Upon prolonged operation of the reformer, for example, in the electrochemical generator, the reforming catalyst material including the catalyst support and the catalyst deposited thereon are subject to mechanical disintegration, fracturing, dusting and/or pulverization, during carbon formation which can lead to a pressure buildup across the reformer bed, and, consequently, degradation of the generator electrical output. Moreover, the removal of the carbon, once formed, if needed to regenerate the surface activity of the catalyst by, for example, oxidation, is difficult. Them is a need to provide a reforming catalyst material including the catalyst support structure that is not subject to mechanical breakdown and dimensional instability during carbon deposition to provide prolonged catalyst operation, even at lower O:C ratios.

Moreover, commercial reforming catalyst materials typically used in high temperature, solid oxide fuel cell generators typically include catalyst support structures in the form of pellets which are packed in a tubular internal reforming chamber. As described above, the catalyst pellets are typically made from a porous, rigid, sintered alumina support structures which are doped with Ni and possibly MgO. These catalyst pellets can be configured in various shapes, such as spherical, oblate spheroid, annular ("Raschig rings") and wagon wheel shapes. The more complex shapes have relatively greater surface area than simple shapes (e.g., spheres), but complex shapes have drawbacks with respect to flow resistance and thermal conductivity through the catalyst bed as well as mechanical disintegration problems.

These catalyst pellets are further typically contained in a packed arrangement within an elongated reformer tube inside the fuel cell generator through which the reformable gas mixture stream is passed. These tightly packed catalyst pellets, however, resist gas flow and result in a substantial pressure drop through the catalyst bed. A low pressure drop of the reformable gas mixture stream is desirable through the catalyst bed, but is difficult to achieve in a bed comprised of such catalyst pellets. The pellets have an adverse impact on the reformable feed gas pumping pressure in the catalytic reformer.

In addition, whereas the reforming reactions are endothermic, the pellets detract from heat transfer from the reformer tube wall toward the center of the catalyst pellet bed. The pellets thus adversely affect the efficiency of the reforming reaction. To compensate, the reformer tube size must be reduced and elongated to provide a smaller cross section, and the overall compactness of the reformer suffers.

Typical hydrocarbon reformer designs consist of a plurality of long, thin tubes filled with these catalyst pellets. Such a reformer design is used to achieve high heat transfer rate while maintaining a long gas flow path over a large area of active catalyst. However, this configuration is not space or volume efficient. Moreover, it results in a relatively high pressure drop of the reformer gas stream through the catalyst bed. Some proposed hydrocarbon reformer applications are extremely limited in available space allocation and also in pumping pressure available to drive the reformer gas through the catalyst bed. An example is an internal reformer for a high temperature, solid oxide fuel cell recirculation generator incorporating an ejector or nozzle as the gas stream motive element. There is a need for a more optimal configuration of the reforming chamber and the reforming catalyst material contained therein including the catalyst support structure and catalyst deposited thereon, to improve heat transfer rates and resistance to pressure drops.

It would be advantageous for catalytic hydrocarbon reformers, especially in an electrochemical fuel cell generator apparatus, to contain a reforming catalyst material having a catalyst support structure impregnated with catalyst that is not prone to mechanical or dimensional breakdown due to carbon formation, improves gas stream pressure drop through the catalyst bed, and enables a high heat flux to pass from the catalyst containment wall to the reformable gas stream. According to one aspect of the present invention, a catalyst material is provided including a porous, non-rigid catalyst support material impregnated with a reforming catalyst. The non-rigid, catalyst support is compressible and improves the stability of the catalyst support against pulverization. Moreover, even in the event of generation operation where carbon formation may occasionally become possible, the non-rigid catalyst support of the invention provides structural stability to the catalyst material without pulverization of the catalyst support or the catalyst. According to another aspect of the present invention, a catalyst material is provided including a catalyst support configuration elongated in the direction of reformable gas flow having discrete flow paths or passageways along the catalyst support body to define a reformable gas mixture flow channel or channels therein which provide passageways for the reformable gas mixture at lower pressure drops and heat transfer rates. The catalyst support configuration, therefore, defines discrete passageways along its length for substantial portions of the reformable gas mixture, improving heat transfer properties and reducing the pressure drop and pumping requirements across the catalyst bed.

SUMMARY OF THE INVENTION

It is an object of the invention to provide an electrochemical generator apparatus containing an internal catalytic hydrocarbon reformer including a reforming catalyst material comprising an improved reforming catalyst support material.

It is another object of the invention to provide a reforming catalyst support material that is non-rigid, flexible and compressible.

It is another object of the invention to provide a reforming catalyst support material having dimensional stability that is not prone to mechanical degradation and pulverization of the catalyst support and catalyst thereon and its support structure during prolonged operations.

It is a further object of the invention to provide an electrochemical generator apparatus containing an internal catalytic hydrocarbon reformer including a reforming catalyst material comprising an improved reforming catalyst support configuration.

It is yet another object of the invention to provide a reforming catalyst support configuration defining flow channels or passageways therein for passage of a reformable gas mixture stream that improves heat transfer characteristics and further reduces reformable gas mixture stream pressure drops across the catalyst support.

It is a further object of the invention to provide a catalytic hydrocarbon reformer having a reforming catalyst support configuration that is compact.

It is an advantage of the invention to provide a reforming catalyst material that is not degraded by carbon formation during prolonged use.

It is another advantage of the invention to provide a reforming catalyst material having a low gas stream pressure drop through the reforming catalyst support material.

It is another advantage of the invention to provide a reforming catalyst material having a high heat flux between the reforming catalyst support material containment wall and the reformable gas mixture stream.

One aspect of the invention resides in a reforming catalyst material comprising a catalyst support impregnated with catalyst characterized by the catalyst support being made of a non-rigid, porous, fibrous catalyst support material, wherein the fibers are compressible and substantially unsintered. The catalyst support is preferably made from alumina, and preferably impregnated with catalytic Ni and MgO. The catalyst support is preferably elongated in the direction of reformable gas flow. The non-rigid and compressible nature of the catalyst support improves dimensional stability during carbon formation in reforming operations.

In another aspect of the invention resides in a reforming catalyst material configuration characterized by a porous reforming catalyst support impregnated with catalyst, where the catalyst support is elongated in a direction of flow of a reformable hydrocarbon gas, and where a reformable gas contacting surface of the catalyst support defines at least one discrete passageway extending along the length of the catalyst support to form a reformable gas flow channel, the at least one discrete passageway being in heat communication with means for heating the reformable hydrocarbon gas in the at least one discrete passageway. Preferably, the catalyst support is characterized by a plurality of discrete passageways extending along the length of the catalyst support forming a plurality of gas flow channels, where at least one of the gas flow channels carries the reformable hydrocarbon gas. The discrete passageways are preferably formed at least partly by integral slots extending inwardly into, the catalyst support and elongated in the direction of gas flow, and there is preferably at least one confining wall made from a high temperature resistant, thermally conductive material disposed around the catalyst support, where the confining wall partly closes the integral slot. The catalyst support impregnated with catalyst configuration according to the invention configured to define discrete reformable hydrocarbon gas flow channels improves reformable hydrocarbon gas stream pressure drop through the catalyst bed of the reforming chamber, enables a high heat flux to exist from the catalyst support containment wall to the reformable gas stream disposed in the flow channels, and allows for compactness of design.

Another aspect of the invention resides in an electrochemical generator apparatus, especially a high temperature, solid oxide electrolyte fuel cell generator, comprising; an elongated generator chamber containing at least one cell bundle, the bundle containing a plurality of parallel, elongated electrochemical cells, each cell having an exterior fuel electrode, an interior air electrode, and a solid oxide electrolyte therebetween, a fresh gaseous feed fuel inlet to the generator chamber, a gaseous feed oxidant inlet to the generator chamber, at least one gaseous spent fuel exit from the generator chamber, a combustion chamber, at least one gaseous combusted exhaust exit from the combustion chamber, and, a reforming chamber containing a hydrocarbon reforming catalyst material comprising a catalyst support impregnated with a reforming catalyst, where a spent fuel exit channel passes from the generator chamber to combine with a fresh hydrocarbon feed fuel inlet at a mixing chamber, and a reformable hydrocarbon gas mixture passes from the mixing chamber to the reforming chamber, wherein the reformable hydrocarbon gas mixture is substantially reformed and passes from the reforming chamber into the generator chamber, and, further wherein the a reformable gas contacting surface of the reforming catalyst support impregnated with catalyst comprises at least one discrete passageway formed at least partly integrally in the reforming catalyst support and extending along the length of the reforming catalyst support in the direction of reformable hydrocarbon gas flow forming a reformable gas flow channel, the at least one discrete passageway being in heat communication with means for heating the reformable hydrocarbon gas in said at least one discrete passageway. Preferably, the reformable gas contacting surface of the catalyst support comprises a plurality of discrete passageways disposed adjacent one another in the catalyst support. Preferably, the means for heating said reformable hydrocarbon gas comprises said spent gas exit or combusted exhaust gas exit which is directed in heat communication with a wall of the reforming chamber, wherein the wall of the reforming chamber is disposed around the catalyst support, partly closing the at least one discrete passageway. Further, the reforming catalyst material is preferably made of a non-rigid, porous, fibrous catalyst support material, wherein the fibers are compressible and substantially unsintered, and impregnated with catalytic Ni and MgO.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The term "fuel electrode" as used herein means that electrode in contact with hydrocarbon fuel, the term "air electrode" as used herein means that electrode in contact with air or oxygen. The terms "spent" fuel or "spent" oxidant as used herein refer to partially reacted, low BTU fuel, or partially reacted, depleted oxidant, e.g., containing about 5 to 15% oxygen, respectively. The term "spent" does not include the mixture of the spent fuel combusted with spent oxidant, which mixture is described herein as "combusted exhaust" gas.

Figure 1:
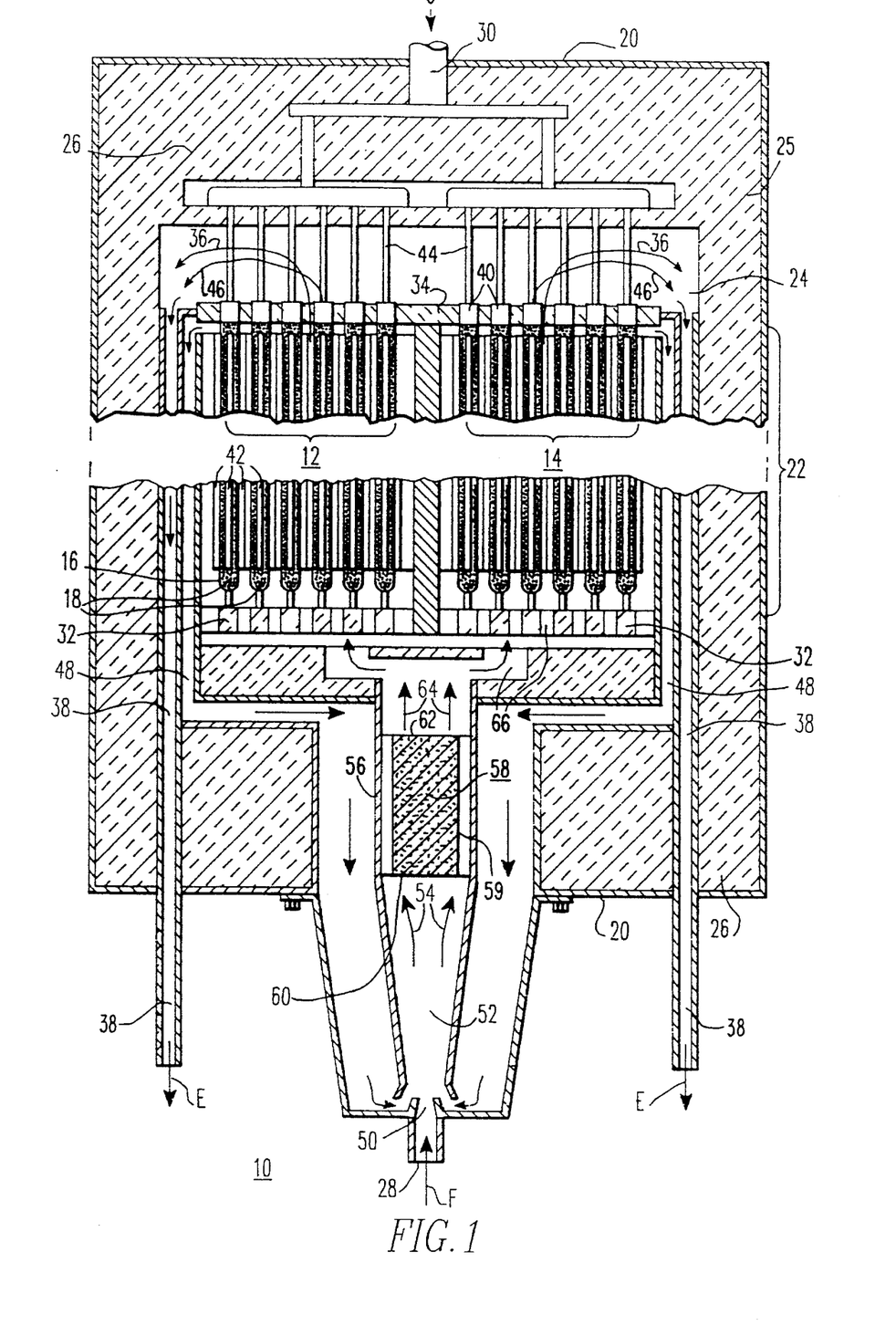
FIG. 1 is a section view along an axial plane, through one embodiment of a high temperature, solid oxide electrolyte electrochemical generator including an internal reforming chamber 56 containing a reforming catalyst material comprising a reforming catalyst support configured according to the invention impregnated with catalyst, shown partly cut away along a direction of axial elongation.

Referring to FIG. 1, an electrochemical apparatus or generator 10 is shown containing cell bundles 12 and 14, each bundle having a plurality of parallel elongated electrochemical fuel cells 16, such as solid oxide electrolyte fuel cells. The fuel cells are located in a generator chamber 22, and can be arranged with the cells or bundles arranged in a rectangular or circular configuration, etc.

Each fuel cell 16 has an exterior fuel electrode 18 covering its elongated surface, shown as a stippled section for the sake of clarity, an interior air electrode, and a solid oxide electrolyte between the electrodes. The air electrode and electrolyte are not shown specifically in FIG. 1, and can be arranged in a manner that is known in the art.

The air electrode can be a doped ceramic of the perovskite family, for example, doped $LaMnO_3$. The electrolyte can by yttria-stabilized zirconia. The fuel electrode can be a zirconia-nickel cermet material. A calcia stabilized zirconia support for the air electrode can optionally be used. For a detailed description of the materials and construction of an exemplary fuel cell, reference can be made to U.S. Pat. No. 4,490,444 (Isenberg) and U.S. Pat. No. 4,751,152 (Zymboly), which are hereby incorporated by reference.

The electrochemical generator apparatus is intended to operate with an interior temperature in the range of about 600° C. to about 1200° C. An outer housing 20 generally surrounds the electrochemical generator apparatus. The housing is typically comprised of a high temperature resistant metal such as Inconel or the like. An inner housing (not shown) can surround a plurality of chambers including the generator chamber 22 and a combustion chamber 24. The inner housing, if any, can also comprise a high temperature resistant metal such as Inconel. Thermal insulation 26, such as low density alumina, preferably is disposed within the outer housing 20.

Penetrating the housing 20 and insulation 26 are a fresh hydrocarbon feed fuel inlet 28, where the fresh hydrocarbon feed fuel is shown as F, and an oxidant feed inlet 30, where the oxidant such as air is shown as O. Ports can also be provided for electrical leads and the like (not shown).

The generator chamber 22 extends between a wall 32 and a porous barrier 34. The porous barrier 34 is designed to allow spent fuel gas to exit, as indicated by arrows 36, from the generator chamber 22 to the combustion chamber 24. The generator chamber operates at a pressure slightly above atmospheric, and the combustion chamber 24, operates at a slightly lower pressure than the generator chamber. The spent gas 36 combines with spent oxidant, as indicated by arrows 46, forming a hot combusted exhaust gas, as shown as E, which passes through combusted exhaust channel 38.

High temperature, elongated, solid oxide electrolyte fuel cells 16 extend between the combustion chamber 24 and wall 32 and are disposed in generator chamber 22. The fuel cells 16 have open ends 40 at the combustion chamber 24, and closed ends near wall 32, leading to the generator chamber 22. Each individual cell generates approximately one volt at nominal loading, and a plurality of cells are electrically interconnected through conductive felts 42, typically nickel fiber metal. The cells can be connected in a series-parallel array, as described in U.S. Pat. No. 4,395,468 (Isenberg), which is hereby incorporated by reference, to obtain a desired relationship of output voltage to current capacity.

By way of example, during operation of the electrochemical generator apparatus 10, a gaseous oxidant O, such as air, is fed through oxidant feed inlet 30, and enters oxidant feed conduits 44, for example at a temperature of approximately 500° C. to 700° C., and above atmospheric pressure. The oxidant optionally can be heated prior to entering the housing by conventional means, such as a heat exchanger coupled with a blower. The oxidant in conduits 44 is then passed through the combustion chamber 24, where it is further heated to a temperature of approximately 800° C. to 900° C. by the combusted exhaust gas E. The oxidant then flows through the length of the oxidant circuit, through the conduits 44 which extend down the interior length of the fuel cells 16, being further heated to approximately 1000° C., by virtue of absorbing most of the heat generated during the electrochemical reaction. A smaller fraction of the heat is absorbed by the fuel.

The oxidant is discharged into the closed end bottom of the fuel cells 16. The oxidant within the fuel cells reverses direction, and electrochemically reacts at the inner air electrode along the inside active length of the fuel cells, being depleted somewhat in oxygen content as it approaches the opposite open end 40 of the fuel cells 16.

The oxidant is reduced at the air electrode-electrolyte interface, supplying oxygen ions which migrate through the electrolyte to the fuel electrode-electrolyte interface where they are oxidized in the presence of reformed hydrocarbon fuel to produce electrons which flow through an external load circuit to the air electrode, thus generating a flow of electrical current. The electrochemical reactions at the air and fuel electrodes where hydrogen is used as a fuel, for example, are given by the following equations:

$$O_2 + 4e^- \rightarrow 2O^{2-} \text{ (air electrode)}$$

$$2O^{2-} + 2H_2 \rightarrow 2H_2O + 4e^- \text{ (fuel electrode)}.$$

A more complete description of the operation of this type of electrochemical cell can be found in U.S. Pat. No. 3,400,054 (Ruka), which is hereby incorporated.

The depleted or spent oxidant is then discharged into the combustion chamber 24 through the open fuel cell ends 40, and is shown as spent oxidant exit streams 46. The spent oxidant 46 combusts with depleted or spent fuel, part of which passes through porous barrier 34 as shown by arrow 36, to form combusted exhaust gas, which exits the apparatus, for example, through one or more combusted exhaust channels 38, finally exiting as the exhaust gas shown as E. The combusted exhaust gas E can be directed to pass in heat transfer communication with the wall of a reformer prior to exiting the apparatus. The combusted exhaust channels 38 can be made of a high temperature resistant metal, such as Inconel.

In the invention, a gaseous hydrocarbon feed fuel F that has not yet been reformed, such as a gaseous hydrocarbon, including hydrocarbons such as methane, ethane, propane and the like, vaporized petroleum fractions such as naphtha, alcohols such as ethyl alcohol and the like, and/or natural gas, can be fed to the electrochemical generator apparatus through fresh feed fuel inlet channel 28. For example, a mixture of 85% methane, 10% ethane with a balance of propane, butane and nitrogen, can be fed into the electrochemical generator apparatus through fresh hydrocarbon feed fuel inlet channel 28 and reformed in a reforming chamber 56 into combustible compounds less likely to produce carbon formations and soot on a catalyst material 58 within the reforming chamber 56. The term "catalyst material" as used herein refers to a reforming catalyst support material having a reforming catalyst treated, impregnated or doped thereon, and optionally including other promoters or the like.

In the embodiment shown in FIG. 1, a major portion of the hot, gaseous spent fuel formed along the length of the fuel cells 16 passes to at least one spent fuel recirculation channel 48. Spent fuel recirculation channel 48 likewise can be made of a high temperature resistant metal such as Inconel. Another portion of the hot spent fuel passes into a combustion chamber 24, as previously shown by arrow 36, to combust with spent oxidant, as previously shown by arrow 46, and to preheat the fresh oxidant feed O. The spent fuel recirculation channel 48 containing spent fuel passes from the generator chamber 22 to feed into and combine with the fresh hydrocarbon feed fuel containing feed fuel F at a mixing apparatus 50.

The mixing apparatus 50 can be any known type in the art, for example, an ejector, jet pump, nozzle, aspirator, mixer-nozzle/mixer-diffuser or the like. This allows recirculation of a portion of the spent fuel fed into spent fuel recirculation channel 48 to mix with the fresh hydrocarbon feed fuel F fed through inlet 28 at the mixing apparatus 50 to produce a reformable gas fuel mixture, as shown by arrows 54. In addition, the mixer optionally can be designed such that the dynamic energy of the fuel mixture at the entrance to the mixer 50, such as a nozzle, is effectively convened to an elevated pressure at an entrance to a reforming chamber 56 by a diffuser 52, the cross-sectional area of which gets larger as it proceeds from its entrance near the nozzle, to the reforming chamber 56.

Prior to passing through the catalytic hydrocarbon reforming chamber 56, the reformable gas fuel mixture 54 generally contains at least $H_2O$ vapor (steam), and typically also $H_2$, CO and $CO_2$, all contributed by the spent fuel that enters the mixer apparatus 50 through the spent fuel recirculation channel 48. Preferably, the volume ratio of spent fuel to fresh feed fuel is adjusted by controlling the velocity of the fresh feed fuel input in the mixing apparatus 50 so that approximately two volumes to five volumes of $H_2O$ (steam) and $CO_2$ are added to each volume of fresh feed fuel. A preferred O:C volume ratio is from about 1.2:1 to 3:1 for a natural gas fueled electrochemical fuel cell generator. The presence of $H_2O_{(g)}$ and/or $CO_2$ plus a reforming catalyst material allows for the conversion of gaseous hydrocarbons to CO and $H_2$ and reduces the rate of carbon formation due to hydrocarbon cracking.

The reforming reactions for methane and ethane (natural gas) using water and carbon dioxide, for example, are given by the following equations:

$$CH_4 + H_2O \rightarrow CO + 3H_2 \quad (1)$$

$$CH_4 + CO_2 \rightarrow 2CO + 2H_2 \quad (2)$$

and, $$C_2H_6 + 2H_2O \rightarrow 2CO + 5H_2 \quad (3)$$

$$C_2H_6 + 2CO_2 \rightarrow 4CO + 3H_2 \quad (4)$$

The reforming reaction is endothermic and best performed at a temperature of about 900° C.

In the embodiment shown in FIG. 1, the hydrocarbon reformable gaseous fuel mixture 54 next passes from the exit of the mixing apparatus through a catalytic hydrocarbon reforming chamber 56 containing a hydrocarbon reforming catalyst material 58 cartridge comprising a self-supporting catalyst support material that is treated with a reforming catalyst and optionally also treated with promoters or the like. The reformable gas mixture is reformed into a relatively low carbonizing fuel, as shown by arrows 64, and exits the reforming chamber into the generator chamber 22 through generator chamber entry ports 66 parallel to the generator chamber 22.

The reforming chamber 56, as shown in FIG. 1, can contain, for example, a reforming catalyst material 58 having an elongated, cylindrical, catalyst support configuration that defines elongated flow channels or passageways 59 extending through catalyst material 58 positioned in the reforming chamber 56, elongated in the direction of the reformable gas flow path. The channels can be defined in part by annular openings between concentric tubular sections, axial slots, grooves or channels, and/or otherwise formed as explained more fully hereinafter. The reforming chamber 56 can be made of a high temperature resistant metal such as Inconel and configured to accept the reforming catalyst material 58 correspondingly configured therein.

The spent fuel recirculation channel 48 is preferably arranged for thermally conductive contact with the means defining the flow channels 59 of the reforming chamber 56, to allow heat transfer between hot spent gas in the recirculation channel 48 and the reformable gases 54 passing through the reforming chamber 56. This arrangement transfers heat energy from the recirculated spent fuel to provide heat energy needed for the endothermic reforming reaction, which is best performed at approximately 900° C. Additionally, according to the embodiment in FIG. 1, the recirculated spent fuel continues in recirculation channel 48 down and around to the mixing nozzle 50 and in contact with the outside of the mixer diffuser chamber 52 with a further transfer of heat energy to the reformable fuel gaseous mixture 54 as it approaches the reforming chamber 56.

The combusted exhaust gas channel 38 can also optionally be arranged for thermal transfer to the reforming chamber 56 to provide additional heat to the reformer in a similar manner. For example, the combusted exhaust gas channel 38 can be arranged to pass through an annular opening between concentric tubular sections of the reforming chamber.

Further, in the embodiment FIG. 1, the temperature of the spent fuel can be reduced from approximately 1000° C. at the entrance to the recirculation fuel channel 48 to a sufficiently low temperature as it approaches the mixing nozzle 50 that the fresh hydrocarbon feed fuel F does not exceed 400° C. The configuration, thus, can further prevent carbon deposition and soot formation due to hydrocarbon cracking which occurs at temperatures above 400° C.

According to one aspect of the invention, the reforming chamber 56 generally comprises a walled vessel containing a reforming catalyst material 58 therein, the reforming catalyst material having separate flow channels 59 extending along the flow path of the reformable gas, directed toward the fuel cells, and the flow paths of one or both of the hot spent gas and the combusted exhaust gas directed in close proximity to the reformable gas flow paths. Heat energy passes through the body of the reforming chamber from one of the flow paths to the other. The flow path for at least the reformable gas is lined with the reforming catalyst, and preferably the catalyst is included on the surfaces defining the reformable gas flow path.

A number of alternative specific structures for the reforming chamber 56 are possible. The reforming chamber 56 can have a circular, oval or rectangular cross section and can be more or less thick. Whereas the body of the reforming chamber 56 is traversed by the adjacent discrete passageways 59 defined in the reforming catalyst material 58, the separate flow paths 59 of the gases are defined in a manner that brings the gases into thermal transfer relationship in a compact and effective manner. Moreover, the flow paths 59 allow the reformable gas mixture 54 to traverse the reforming chamber 56 without substantial reduction in pressure across the catalyst.

Figure 2:
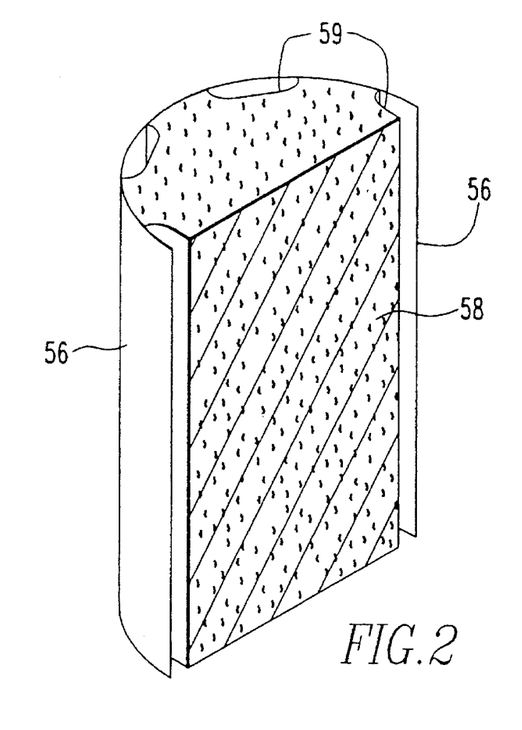
FIG. 2 is a lateral section view of a monolithic reforming catalyst material comprising a catalyst support arrangement according to an embodiment, showing separate adjacent gas passageways integrally defined within the catalyst support for reducing pressure drop across the catalyst material and for transferring thermal energy from the hot gases to the reformable gases, at least the latter being heated in the presence of a reforming catalyst doped on the catalyst support.
Figure 3:
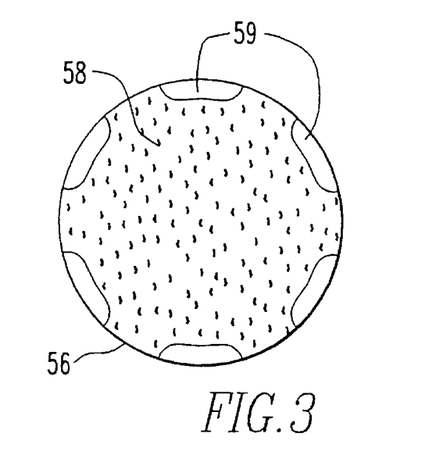
FIG. 3 is a top view of the catalyst material of FIG. 2.

In one embodiment as shown in FIG. 2 and FIG. 3, the reforming chamber 56 can contain a reforming catalyst material 58 comprising an elongated catalyst support material impregnated with reforming catalyst. The catalyst support is generally cylindrical and defines a plurality of flow passageways 59 for the reformable gas mixture 54, the flow passageways being disposed parallel to and at a radial distance from the central axis of the catalyst support. Preferably, the catalyst support material is made from non-rigid, porous, fibrous, substantially unsintered, alumina that is impregnated with catalytic Ni and MgO. The plurality of radial-groove or slot passageways 59 can be integrally formed within the catalyst support material by known occlusion techniques such as, for example, by selectively compressing the flow path areas. The plurality of radial-groove or slot passageways 59 for the reformable gas mixture 54 are formed to extend radially inwardly from the outer circumference to improve heat transfer and resistance to pressure drop across the catalyst material.

The groove or slot passageways 59 are closed on the outside by suitable reforming chamber containment walls 56, such as high temperature resistant Inconel or the like, which can guide the hot spent fuel gas in the spent fuel gas recirculation channel 48 downwardly, as shown, or upwardly (not shown), to define either concurrent or countercurrent flow. The groove or slot passageways 59 can also be closed on the outside by a separate high temperature resistant metal walls such as Inconel. It is also possible that the separate passageways could be oriented in another manner or arranged for flows in other relative directions such as concurrent, countercurrent or cross flows in an electrochemical generator that was generally configured differently. It is also possible that the catalyst material 58 comprise a catalyst support which also defines an axial passage closed by suitable inner reforming chamber containment walls or separate metal walls, the axial passageways being used for spent fuel gas and/or combusted exhaust gas to flow within. The catalyst material, accordingly, includes an additional plurality of passageways 59 for the reformable gas mixture 54 disposed parallel to the axial passage and at a radial distance from the inner circumference as is shown in FIG. 4.

Figure 4:
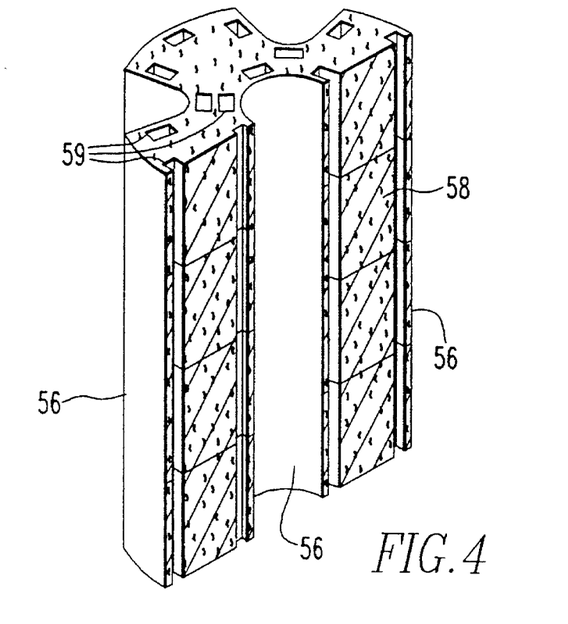
FIG. 4 is a lateral section view of a finned reforming catalyst material including a catalyst support arrangement according to the invention, showing a plurality of compact, stackable discs, each disc having separate adjacent passageways integrally defined with each catalyst support disc, for reducing pressure drop across the catalyst material and for transferring thermal energy from the hot gases to the reformable gases, at least the latter being heated in the presence of a reforming catalyst doped on the catalyst support.
Figure 5:
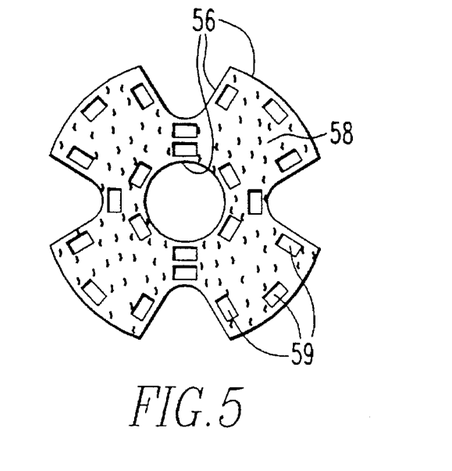
FIG. 5 is a top view of the catalyst material of FIG. 4.

FIG. 4 and FIG. 5 show an alternative embodiment in which the reforming catalyst material 58 comprises a catalyst support impregnated with catalyst which is configured as a tubular and finned arrangement to define inner and outer flow channels 59 extending parallel to the axis of the generally tubular catalyst support material. Moreover, FIG. 4 shows the reforming material 58 as stackable discs, each disc having the discrete flow paths 59 defined therein. The discs provide for easier assembly and disassembly of the catalyst material in the reforming chamber. The catalyst material is confined by inner and outer tubular walls, for example, the reforming chamber walls 56, of thermally conductive material, such as Inconel, thereby defining separate passageways for the reformable gas mixture 54. The surfaces at which the reformable gas mixture 54 contacts the reforming catalyst material 58 in this case is defined by generally rectangular grooves or slots 59 along the direction of reformable gas flow. Other shapes are also possible. Furthermore, the grooves can define irregular shapes, for example defining a scalloped or rippled surface, for providing increased surface area along the flow paths.

Referring again to the embodiment in FIG. 1, the reforming chamber 56 is preferably arranged in an axially elongated tube for accepting the reforming catalyst material 58 therein and to couple the reformable gas mixture fuel inlet 60 and reformed gas fuel outlet 62. At least this passage for the reformable gas mixture 54 contains a reforming catalyst material 58 including catalyst support and catalyst as generally shown in FIGS. 2 and 4. The reforming chamber containment walls 56, therefore, enclose around the outside of the reforming material 58 and can define part of the walls of the separate flow channels 59 (i.e., the outermost channels in FIG. 2 and both the outermost and innermost channels in FIG. 4.)

For this purpose, the reforming catalyst material 58 includes a catalyst support body which is preferably made of a self-supporting material, preferably comprising a self-supporting, porous alumina material which is impregnated with catalytic Ni and possibly MgO, and optionally promoters. The reforming catalyst material 58 having the configuration according to the invention can comprise conventional rigid, pressed or sintered alumina catalyst support impregnated i.e., distributed throughout the bulk of the catalyst support material, with a reforming catalyst. However, a conventional rigid catalyst support is not preferred. According to the other aspect of the invention as explained more fully hereinafter, it is most preferable for the reforming catalyst material 58 comprise a non-rigid, porous, fibrous alumina support impregnated at least on the reformable gas mixture contacting surfaces with catalytic material, wherein the catalyst support is flexible and substantially not sintered, and then molded into the required shape to define the separate reformable gas contacting surfaces or flow channels 59 along the length of the catalyst support. The reforming catalyst typically comprises catalytic Pt and Ni, preferably Ni, and can also comprise metal salts and metal oxides selected from the group of Mg, Ca-Al, Sr-Al, Zr, Y, Ce, Ba and mixtures thereof, preferably Mg and Ca, even more preferably Mg. A more detailed description of the reforming catalyst composition and method of impregnating the catalyst support with catalyst can be found in U.S. Pat. No. 4,898,792 (Singh et al.), which is hereby incorporated by reference.

Thus, rather than using a packed bed of commercial catalyst pellets contained within a reforming chamber containment walls, and thus substantially occluding the flow path, the reforming catalyst material 58 configuration having discrete passageways 59 defined along the length of the catalyst support according to the invention includes a catalyst support that integrally exposes the impregnated reforming catalyst along surfaces that contact the reformable fuel gas mixture 54 without substantial pressure drops, while also defining adjacent passageways 59 for appropriate transfer of heat energy. The result is good heat transfer, a low pressure drop, a very compact, easy to assemble and efficient arrangement for the catalyst material 58 and the reforming chamber 56. The heat transfer can be further improved by partly defining certain of the passageways by reforming chamber containment walls 56 made of high temperature resistant thermally conductive material (e.g., metal), such passageways being also partly defined by outer surfaces of the catalyst material 58 itself.

Thus, the low pressure drop and high heat flux flow channels 59 defining the reformable gas contacting surfaces directs a substantial portion of the reformable gas mixture 54 flow to be adjacent the hot reforming chamber wall 56 where the preferably-irregular surface receives thermal energy from the reforming chamber partitioning wall and transfers heat energy to the reformable gas mixture by radiation, conduction and convection. Therefore, the flow channels 59 provide superior heat transfer to the reformable gas mixture, while maintaining close contact between the catalytic sites and the reformable gas stream. By using this reforming catalyst material configuration, a significant increase in heat transfer area per reformer volume can result. Therefore, this catalyst configuration is particularly adaptable to many compact geometries, which would not be practical with commercial catalyst pellets.

The flow channels 59 additionally allow for a substantially unobstructed flow path of the reformable gas mixture 54 through the reforming chamber 56 and substantially reduce pressure drop in the reforming chamber. This is particularly advantageous in a fuel cell generator apparatus where pumping pressure available to drive the reformable gas mixture 54 through a reforming catalyst material 58 is limited. Moreover, the use of elongated pieces of reforming catalyst material configured with integral flow channels 59 defined in the catalyst support along the continuum thereof can also provide significant improvement in the catalyst installation and removal process over that required for loose catalyst pellets in a reforming chamber.

It will be appreciated that other particular configurations having such integrally formed separate flow paths are also possible. Additionally, the invention can be applied to other specific flow configurations for electrochemical generators having internal catalytic hydrocarbon reforming chambers, for example, as taught in U.S. Pat. Nos. 4,983,471 (Reichner et al.); 5,047,299 (Shockling); 5,082,751 (Reichner); 5,143,800 (George et al.); and, 5,169,730 (Reichner), which are hereby incorporated.

According to the other aspect of the invention, the reforming catalyst material 58 comprises a porous, non-rigid and, thus, flexible catalyst support material which substantially reduces mechanical or dimensional breakdown of the reforming catalyst material 58 that is believed to result from slow deposition or buildup of carbon on the reforming catalyst material upon prolonged reforming operations.

It is known that the long term operation of a hydrocarbon fueled electrochemical generator, such as a high temperature, solid oxide electrolyte fuel cell generator containing an internal reforming chamber containing commercial reforming catalyst pellets cause problems. Commercial rigid, porous, sintered alumina catalyst supported, nickel-based reforming catalyst pellets are prone to mechanical degradation, pulverization and dusting, due to slow deposition of carbon. Carbon deposition leads to a pressure buildup across the reformer bed and, consequently, degradation of the generator's electrical output. Structural and chemical analysis of a disintegrated and pulverized catalyst in a electrochemical generator has shown that the mechanical breakdown is due to carbon formation in the catalyst, especially filamentary carbon formation.

A conventional rigid sintered alumina catalyst support material impregnated with reforming catalyst having a surface morphology of carbon formed thereon after operation in a high temperature, solid oxide fuel cell generator at 500° C. in the presence of carbon forming gases of a $CH_4$—$H_2O$ gas mixture having a steam to carbon ratio of 1:1 for about 65 hours experienced severe mechanical disintegration and pulverization of the catalyst support structure. Thus, changes in the catalyst support body material chemistry and carbon formation over time are detrimental to the catalyst support stability.

However, the porous, non-rigid, fibrous, substantially unsintered, reforming catalyst material 58 according to the invention is characterized by an alumina catalyst support that is not rigidly sintered or pressed to rigidity and, therefore, is not characterized by extensive rigid interparticle and interfiber bonding. Thus, the reforming catalyst support does not contain rigid sintered contacts between granular or fibrous supports. In the absence of these rigid contacts, the catalyst support is flexible and compressible and remains substantially resistant to dimensional and mechanical degradation, pulverization, dusting and fracturing during carbon formation and further during subsequent removal of carbon from the support by oxidation. The non-rigid alumina support is made from alumina fibers interwoven together that make it flexibly compressible and substantially resistant to internal stresses developed in the catalyst material due to carbon deposition. The density of the non-rigid, porous, substantially unsintered, fibrous, catalyst support is preferably between 15–45 lb/ft$^3$, typically 15 lb/ft$^3$, 30 lb/ft$^3$, or 45 lb/ft$^3$. The non-rigid, porous, alumina support is preferably treated or impregnated with catalytic Ni to reform the hydrocarbons and also MgO to improve $H_2O$ adsorption. The catalytic doping materials, e.g. Pt and Ni, preferably Ni, and modifiers, e.g. metal salts and metal oxides selected from the group of Mg, Ca-Al, Sr-Al, Zr, Y, Ce, Ba and mixtures thereof, preferably Mg and Ca, even more preferably Mg, and the method of impregnation on the catalyst support are taught in U.S. Pat. No. 4,898,792 (Singh et al.), which is hereby incorporated.

The flexible or compressible catalyst support material according to the invention remains flexible during reforming operations and, therefore, upon the slow deposition of carbon on the surfaces thereof, it is not subjected internal stresses that accompany conventional materials. It therefore remains substantially intact over prolonged operations. The catalyst supports remains flexible by being made from fibers and not being substantially sintered.

The invention will be further clarified by a consideration of the following example, which is intended to be purely exemplary of the use of the invention.

EXAMPLE 1

A reforming catalyst material according to the invention was prepared by impregnating a non-rigid, porous, substantially unsintered, alumina support material (fibrous alumina ($Al_2O_3$) based insulation material (ZAL-15)) with Ni and MgO by the method of impregnation disclosed in U.S. Pat. No. 4,898,792 (Singh et al.). The reforming catalyst material was then positioned in a reforming chamber of a high temperature, solid oxide electrolyte generator apparatus, such as shown in FIG. 1, in the presence of a $CH_4$—$H_2O$ gas mixture (steam to carbon ratio of 1:1) at 500° C. for about 65 hours. A commercial prior art rigid, sintered alumina catalyst support impregnated with Ni and MgO in the form of pellets was also prepared and tested as described above.

A non-rigid, substantially unsintered, fibrous, alumina reforming catalyst support impregnated with Ni and MgO according to the invention was compared to a commercial prior art rigid, sintered, alumina reforming catalyst support pellet after prolonged operation in the high temperature, solid oxide electrolyte fuel cell generator. The conventional catalyst support impregnated with catalyst showed severe mechanical disintegration, pulverization, fracturing and dusting of the catalyst support due to carbon deposition, whereas the non-rigid reforming catalyst support treated with catalyst according to the invention remained structurally and dimensionally stable without any substantial dusting or pulverization. The reforming catalyst material according to this aspect of the invention can be configured as described above according to the other aspect of the invention. The reforming catalyst material can also be positioned in a reforming chamber as a continuum or in conjunction with a catalyst pellet bed.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope and spirit of the invention in which exclusive rights are claimed.

We claim:

1. A hydrocarbon reforming catalyst material configuration, comprising a porous reforming catalyst support impregnated with catalyst, at least one confining wall disposed around the catalyst support, said wall comprising a different material than said support, said catalyst support elongated in a direction of flow of a reformable hydrocarbon gas, wherein a reformable gas contacting surface of the catalyst support defines at least one discrete passageway extending along the length of the catalyst support forming a reformable gas flow channel, said at least one discrete passageway is in heat communication with means for heating the reformable hydrocarbon gas in said at least one discrete passageway, wherein the reforming catalyst material support comprises a non-rigid, porous, fibrous alumina catalyst support, wherein the fibers are compressible and substantially unsintered and are impregnated with Ni and MgO.

2. The hydrocarbon reforming catalyst material configuration of claim 1, wherein the reformable hydrocarbon gas contacting surface comprises a plurality of discrete passageways extending along the length of the catalyst support forming a plurality of gas flow channels, at least one of the gas flow channels carrying reformable hydrocarbon gas.

3. The hydrocarbon reforming catalyst material configuration of claim 2, wherein the gas flow channels are formed at least partly by integral slots extending inwardly into the catalyst support and elongated in the direction of gas flow.

4. The hydrocarbon reforming catalyst material configuration of claim 3, further comprising the confining wall partly closing the integral slot.

5. The hydrocarbon reforming catalyst material configuration of claim 4, wherein the confining wall is made of a high temperature resistant, thermally conductive metal or alloy.

6. The hydrocarbon reforming catalyst material configuration of claim 2, wherein the catalyst support is generally cylindrical and elongated in the direction of gas flow.

7. The hydrocarbon reforming catalyst material configuration of claim 2, wherein the catalyst support is generally rectangular and elongated in the direction of gas flow.

8. The hydrocarbon reforming catalyst material configuration of claim 2, wherein the catalyst support comprises a plurality of discs, stackable one upon each other.

9. The hydrocarbon reforming catalyst material configuration of claim 2, wherein the catalyst support has at least one central passageway and at least one integral slot extending inwardly into the catalyst support body, the central passageway and slot being elongated in the direction of gas flow.

10. The hydrocarbon reforming catalyst material configuration of claim 2, wherein the reforming catalyst material comprises a porous, alumina catalyst support impregnated with a reforming catalyst selected from the group of metals consisting of Ni and Pt.

11. The hydrocarbon reforming catalyst material configuration of claim 10, wherein the reforming catalyst further comprises metals or metal oxides selected from the group consisting of Mg, Ca-Al, Sr-Al, Ce and Ba.

12. The hydrocarbon reforming catalyst material configuration of claim 2, wherein the reforming catalyst impregnated on the catalyst support comprises Ni and MgO.

13. An electrochemical generator apparatus comprising:

an elongated generator chamber containing at least one cell bundle, the bundle containing a plurality of parallel, elongated electrochemical cells, each cell having an exterior fuel electrode, an interior air electrode, and a solid oxide electrolyte therebetween;

a fresh gaseous feed fuel inlet to the generator chamber;

a gaseous feed oxidant inlet to the generator chamber;

at least one gaseous spent fuel exit from the generator chamber;

a combustion chamber;

at least one gaseous combusted exhaust exit from the combustion chamber; and, a reforming chamber containing a hydrocarbon reforming catalyst material comprising a catalyst support impregnated with a reforming catalyst, at least one confining wall disposed around the catalyst support, said wall comprising a different material than said support, wherein the reforming catalyst support comprises a non-rigid, porous, fibrous alumina support impregnated with catalyst, wherein the fibers are compressible and substantially not sintered, and elongated in the direction of gas flow, wherein a spent fuel exit channel passes from the generator chamber to combine with a fresh hydrocarbon feed fuel inlet at a mixing chamber and a reformable hydrocarbon gas mixture passes from the mixing chamber to the reforming chamber wherein the reformable hydrocarbon gas mixture is substantially reformed and passes from the reforming chamber into the generator chamber, and, wherein a reformable gas contacting surface of the reforming catalyst support comprises at least one discrete passageway formed at least partly integrally in the reforming catalyst support and extending along the length of the reforming catalyst support in the direction of reformable hydrocarbon gas flow forming a reformable gas flow channel, said at least one discrete passageway being in heat communication with means for heating the reformable hydrocarbon gas in said at least one discrete passageway.

14. The electrochemical generator apparatus of claim 13, wherein the reformable gas contacting surface comprises a plurality of discrete passageways disposed adjacent one another in the catalyst support, and further comprising means for directing the reformable gas through the discrete passageways.

15. The electrochemical generator apparatus of claim 13, wherein the means for heating said reformable hydrocarbon gas comprises said spent gas exit or combusted exhaust gas exit is directed in heat communication with a wall of the reforming chamber, wherein the wall of the reforming chamber is disposed around the catalyst support, partly closing the at least one discrete passageway.

16. The electrochemical generator apparatus of claim 14, wherein the reforming catalyst material comprises a catalyst support impregnated with catalyst in which the gas flow channels are formed at least partly by integral slots extending inwardly into the catalyst support and elongated in the direction of gas flow.

17. The electrochemical generator apparatus of claim 14, wherein the reforming catalyst material comprises a catalyst support having at least one central passage and at least one integral slot extending inwardly into the catalyst support, the central passage and the slot being elongated in the direction of gas flow, and further comprising at least one confining wall disposed around the catalyst support, the confining wall partly closing the integral slot.

18. The electrochemical generator apparatus of claim 13, wherein the catalyst impregnated on the catalyst support comprises Ni and MgO.

* * * * *